United States Patent
Shimamura et al.

(10) Patent No.: US 7,440,003 B2
(45) Date of Patent: Oct. 21, 2008

(54) FOLDING PORTABLE INFORMATION TERMINAL WITH FOLD-POSITION-BASED RECORDING CONTROL

(75) Inventors: Masaki Shimamura, Tokyo (JP); Mika Fujii, Tokyo (JP); Michio Nagai, Tokyo (JP); Kazuo Ootuta, Tokyo (JP); Kiyoshi Kohayakawa, Tokyo (JP); Masatomo Mizuta, Tokyo (JP)

(73) Assignee: NEC Corporation, Tokyo (JP)

( * ) Notice: Subject to any disclaimer, the term of this patent is extended or adjusted under 35 U.S.C. 154(b) by 886 days.

(21) Appl. No.: 10/358,887

(22) Filed: Feb. 6, 2003

(65) Prior Publication Data

US 2003/0153372 A1    Aug. 14, 2003

(30) Foreign Application Priority Data

Feb. 14, 2002   (JP)   ............... 2002-036715

(51) Int. Cl.
*H04N 7/14*   (2006.01)
*H04M 1/00*   (2006.01)

(52) U.S. Cl. .................. 348/14.02; 455/556.1
(58) Field of Classification Search .............. 348/14.02; 455/556.1
See application file for complete search history.

(56) References Cited

U.S. PATENT DOCUMENTS

| | | | |
|---|---|---|---|
| 5,297,146 A | 3/1994 | Ogawa | |
| 5,867,793 A * | 2/1999 | Davis | ............... 455/556.1 |
| 6,115,620 A | 9/2000 | Colonna et al. | |
| 2001/0004269 A1 * | 6/2001 | Shibata et al. | ......... 348/333.06 |
| 2002/0003576 A1 * | 1/2002 | Konishi et al. | ............... 348/232 |

FOREIGN PATENT DOCUMENTS

| | | |
|---|---|---|
| EP | 0 796 026 | 9/1997 |
| GB | 2 333 006 | 7/1999 |
| JP | 8-317154 | 11/1996 |
| JP | 9-166405 | 6/1997 |
| JP | 10-257460 | 9/1998 |
| JP | 11-30226 | 2/1999 |
| JP | 11-215218 | 8/1999 |
| JP | 2001-275094 | 10/2001 |
| JP | 2001-320463 | 11/2001 |

* cited by examiner

*Primary Examiner*—David Ometz
*Assistant Examiner*—Dillon Durnford-Geszvai
(74) *Attorney, Agent, or Firm*—Young & Thompson (57) ABSTRACT

This invention relates to a folding portable information terminal including an upper unit having a display section on one surface, a lower unit having an operating section on one surface, and a movable joining member which openably and pivotally couples the upper and lower units to each other or openably couples the units to each other at one end of each of the units. This portable information terminal includes an upper unit posture detecting unit for detecting opening-closing and/or pivoting operation of the upper unit, an information recording section which records at least one of predetermined voice information, still image information, and moving image information, and an information recording control unit for setting the information recording section in a mode of recording selected predetermined information when the upper unit posture detecting unit detects a shift of the upper unit to a predetermined posture or a shift of the upper unit from a predetermined posture during voice communication or a standby period.

6 Claims, 7 Drawing Sheets

FOLDING PORTABLE INFORMATION TERMINAL WITH FOLD-POSITION-BASED RECORDING CONTROL

BACKGROUND OF THE INVENTION

1. Field of the Inention

The present invention relates to a portable information terminal such as a cellular phone set which has a folding type structure and information recording function and, more particularly, to an improvement in information recording control.

2. Description of the Prior Art

Conventionally, as the structures of portable information terminals, especially cellular phone sets of straight type structures, folding type structures, and the like have been used. Among these cellular phone sets, folding structure type cellular phone sets have been popularized and risen in demand because they can be folded compact. In addition, recently, new folding portable information terminals each having two units such as upper and lower units openably and pivotally coupled to each other have been proposed as in Japanese Unexamined Patent Publication No. 11-30226, Japanese Unexamined Patent Publication No. 11-215218, or Japanese Patent Application No. 2001-303959 by the present inventors ("Folding portable Information Terminal" filed Sep. 28, 2001).

Some portable information terminals have a function of recording information such as voice information and image information. For example, there have proposed many portable information terminals designed to improve convenience by recording received information during voice communication and recording information as a memo during a standby period.

In addition, a portable information terminal which has a camera section to record sensed image information or moving image information and transmit it has been widely known. Apparatuses of this type are disclosed in, for example, Japanese Unexamined Patent Publication No. 10-257460 ("Portable Videophone Apparatus"), Japanese Unexamined Patent Publication No. 2001-275094 ("Information Communication Apparatus"), and Japanese Unexamined Patent Publication No. 2001-320463 ("Portable Terminal Apparatus").

In order to use a portable information terminal having a camera section as a videophone which senses a user himself/herself, a camera opening portion is located on a surface in the same direction as that of the surface on which an image monitoring display unit is disposed. In order to use this terminal to take a picture of the surroundings of the user, a camera opening portion is located on a surface opposite to the surface on which the image monitoring display unit is disposed. For this purpose, each of the portable information terminals described above is designed to change the relative posture of the camera opening portion and monitoring display unit so as to allow the use of the terminal as a videophone or to take a picture of the surroundings of the user. The apparatus disclosed in Japanese Unexamined Patent Publication No. 10-257460 has a camera section and display section designed to be pivotal about a common shaft. The apparatus disclosed in Japanese Unexamined Patent Publication No. 2001-275094 has a pivot mechanism between an image sensing section and a main body portion which displays images. The apparatus disclosed in Japanese Unexamined Patent Publication No. 2001-320463 is designed such that a lid portion having a display unit is made foldable with respect to a housing body and rotatably and pivotally mounted thereon.

In order to use the information recording function of a conventional portable information terminal, however, the user must perform a series of operations by using a predetermined operating section. This applies to the above new folding portable information terminal having the upper and lower units openably and pivotally coupled to each other. The operation in this case is cumbersome for the user. In addition, it is difficult to perform this operation during voice communication. Demand has therefore arisen for an improvement in the usability of the information recording function.

SUMMARY OF THE INVENTION

It is an object of the present invention to provide a highly operable folding portable information terminal having the above-described upper and lower units openably or openably and pivotally coupled to each other, in which an information recording mode for voice information, image information, and the like is set upon detection of the opening-closing/pivoting operation of the unit during voice communication or a standby period, so that an information recording function of recording received information during voice communication and recording information as a memo during a standby period can be easily and simply used.

In order to achieve the above object, according to the first main aspect of the present invention, there is provided a folding portable information terminal including an upper unit having a display section on one surface, a lower unit having an operating section on one surface, and a movable joining member which openably and pivotally couples the upper and lower units to each other, comprising upper unit posture detection means for detecting opening-closing and/or pivoting operation of the upper unit, an information recording section which records at least one of predetermined voice information, still image information, and moving image information, and information recording control means for setting the information recording section in a mode of recording selected predetermined information when the upper unit posture detection means detects a shift of the upper unit to a predetermined posture or a shift of the upper unit from a predetermined posture during voice communication or a standby period.

In order to achieve the above object, according to the second main aspect of the present invention, there is provided a folding portable information terminal including an upper unit having a display section on one surface, a lower unit having an operating section on one surface, and a movable joining member which openably couples the upper and lower units to each other at one end of each of the units, comprising upper unit posture detection means for detecting opening/closing operation of the upper unit, an information recording section which records at least one of predetermined voice information, still image information, and moving image information, and information recording control means for setting the information recording section in a mode of recording selected predetermined information when the upper unit posture detection means detects a shift of the upper unit to a predetermined posture or a shift of the upper unit from a predetermined posture during voice communication or a standby period.

The first and second main aspects include several secondary aspects as follows.

The terminal further comprises at least one each of a camera section and a display section, and at least one camera section opening portion is located on a side opposite to a housing surface on which one display section facing an operator is disposed while the upper unit is in the predetermined posture.

The terminal further comprises at least one each of a camera section and a display section, and at least one camera section opening portion is located on the same side as that of a housing surface on which one display section facing an operator is disposed while the upper unit is in the predetermined posture.

The information recording control means selects at least one type of information from voice information, still image information, and moving image information and sets the information recording section in the recording mode in accordance with a shift of the upper unit to one predetermined posture of a plurality of predetermined postures which the upper unit can take or a shift of the upper unit from the predetermined posture.

The information recording control means causes the information recording section to record information corresponding to a predetermined storage capacity when the upper unit posture detection means detects a shift of the upper unit to the predetermined posture or a shift of the upper unit from the predetermined posture during voice communication or a standby period.

The information recording control means sets the information recording section in the recording mode for a predetermined period of time when the upper unit posture detection means detects a shift of the upper unit to the predetermined posture or a shift of the upper unit from the predetermined posture during voice communication or a standby period.

The information recording control means sets the information recording section in a mode of recording selected predetermined information when a shift of the upper unit to a predetermined posture is detected, and changes the information recording section from the recording mode to a recording cancellation mode when a shift of the upper unit to a different predetermined posture is detected.

The information recording control means sets the information recording section in a mode of recording selected predetermined information when a shift of the upper unit from a predetermined posture is detected, and changes the information recording section from the recording mode to a recording cancellation mode when a shift of the upper unit to the predetermined posture is detected again.

The information recording control means selects at least one of voice information, moving image information, and still image information in accordance with a recordable capacity of the information recording section, and sets the information recording section in the recording mode.

The information recording control means causes the information recording section to record information received via a communication line during voice communication.

The upper unit posture detection means comprises a plurality of magnets (or magnetic field detectors) arranged in predetermined postures inside the upper unit or the lower unit, a magnetic field detector (or a magnet) placed in a predetermined posture inside the other unit in correspondence with the plurality of magnets (or magnetic field detectors), and a posture determining circuit which determines a posture of the upper unit on the basis of an output from the magnetic field detector which corresponds to distances to the magnets and is obtained in accordance with an open/closed state and pivot position of the upper unit with respect to the lower unit.

According to the present invention, the opening-closing/pivoting operation of the upper and lower units of a folding portable information terminal such as a cellular phone set, which are openably or openably and pivotally coupled to each other, is detected during voice communication or a standby period, and a mode of recording voice information, image information, and the like is set. Therefore, received information can be easily and simply recorded during voice communication, and image information from the camera section, voice information, or the like can be easily and simply recorded as a memo. This makes it possible for the folding portable information terminal of the present invention to greatly improve in operability.

The above and many other objects, features and advantages of the present invention will become manifest to those skilled in the art upon making reference to the following detailed description and accompanying drawings in which a preferred embodiment incorporating the principle of the present invention are shown by way of illustrative examples.

BRIEF DESCRIPTION OF THE DRAWINGS

FIGS. 2A to 2D show the structure of the biaxial hinge used in the embodiment of the present invention, in which

DETAILED DESCRIPTION OF THE PREFERRED EMBODIMENT

A preferred embodiment of the present invention will be described below with reference to the accompanying drawings.

A folding portable information terminal according to the present invention is set in an information recording mode during voice communication or a standby period upon detection of opening-closing/pivoting operation of upper and lower units which are openably or pivotally coupled to each other. This makes it possible to easily and simply record received information such as voice information during voice communication or information as a memo such as voice information or image information during a standby period.

The accompanying drawings show an embodiment of a folding cellular phone set as a portable information terminal according to the present invention. Many components of the arrangement of a cellular phone set 500 according to this embodiment which will be described below are common to the folding cellular phone set disclosed in Japanese Patent Application No. 2001-303959.

In addition to the arrangement disclosed in Japanese Patent Application No. 2001-303959, this embodiment includes a camera section 121 for sensing a moving image or still image, an information storage section 120 for recording received information or the information input from the camera section 121, a microphone 103, or the like, and a setting information storage section 119 which stores various setting information associated with information recording and information recording cancellation depending on the relative position of the upper and lower units and the like.

As compared with the control section in Japanese Patent Application No. 2001-303959, a control section 109 in this embodiment further includes a function (rotation/open-close detecting section) of discriminating the open-close/pivot state of the units, a timepiece function (timepiece control section), a function (communication control section 117) of discriminating a communication state, and a function (information recording control section 118) of managing the storage capacity and the like of the information storage section.

Figure 1A:
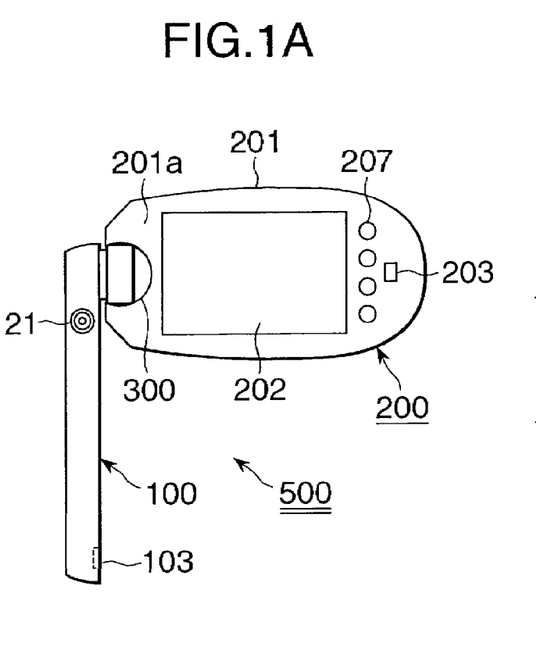
FIGS. 1A and 1B are outline views showing an embodiment of a cellular phone set according to the present invention.
Figure 1B:
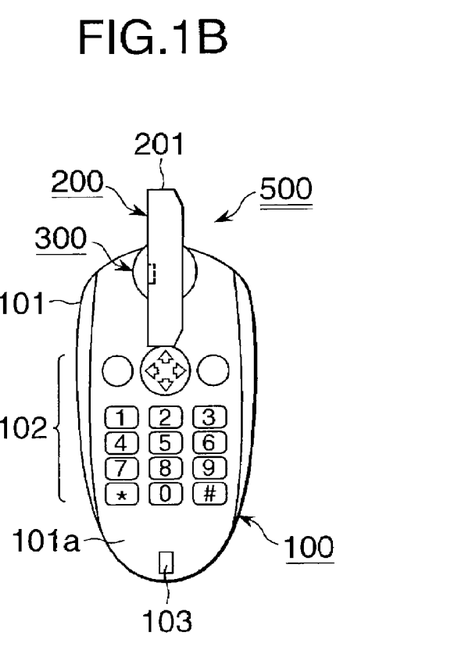
Figure 1C:
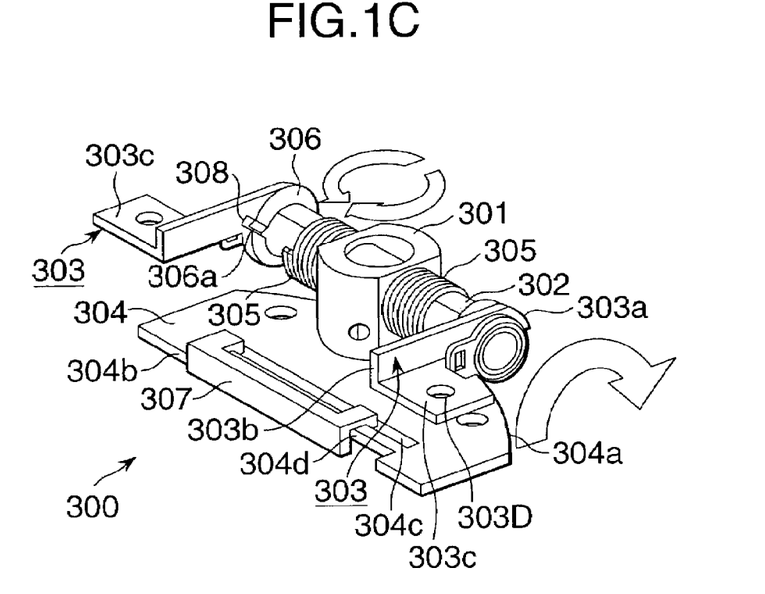
FIG. 1C is a perspective view showing a main part to explain the structure of a biaxial hinge used in the embodiment.

The respective portions of the embodiment of the present invention will be sequentially described below. FIGS. 1A and 1B are outline views of this embodiment in a state wherein the upper unit is so unfolded as to become perpendicular to the lower unit, and the display surface is rotated sideways toward a camera section opening portion formed in a side surface of the lower unit. FIG. 1C shows the structure of a portion near a biaxial hinge (movable connecting member) 300 used in this embodiment.

Figure 3A:
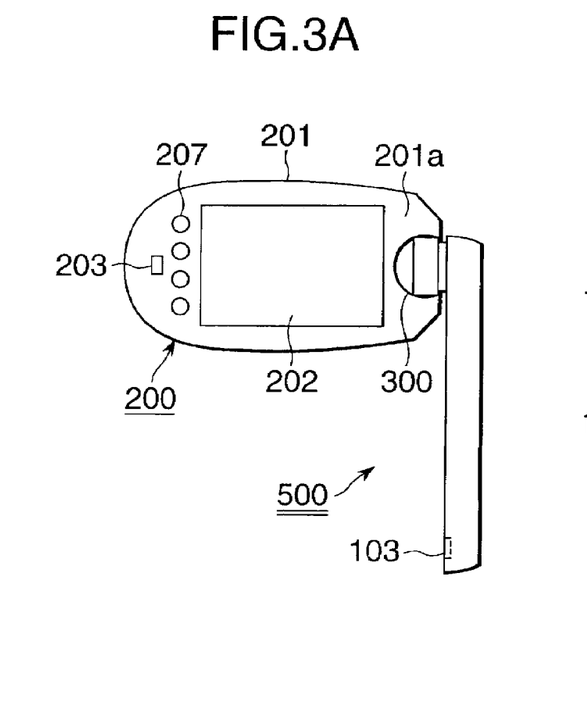
FIGS. 3A to 3C are outline views showing the cellular phone set according to the same embodiment in different postures.
Figure 3B:
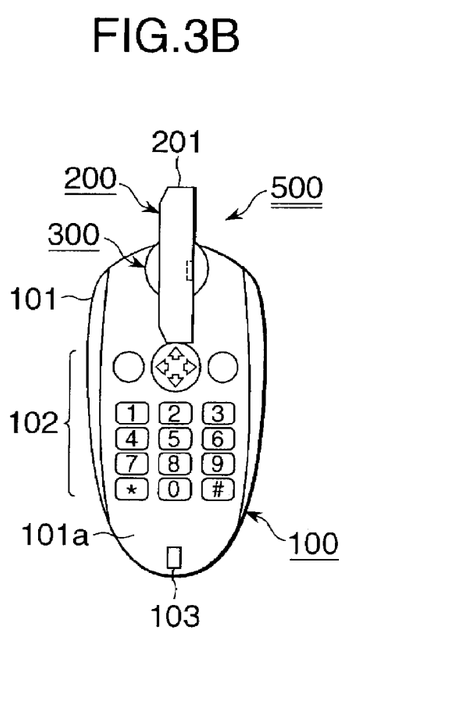
Figure 3C:
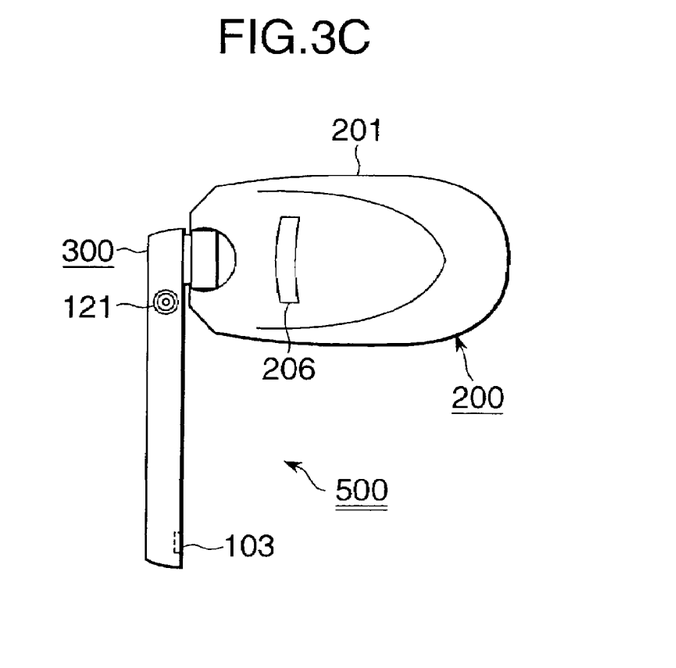
Figure 4:
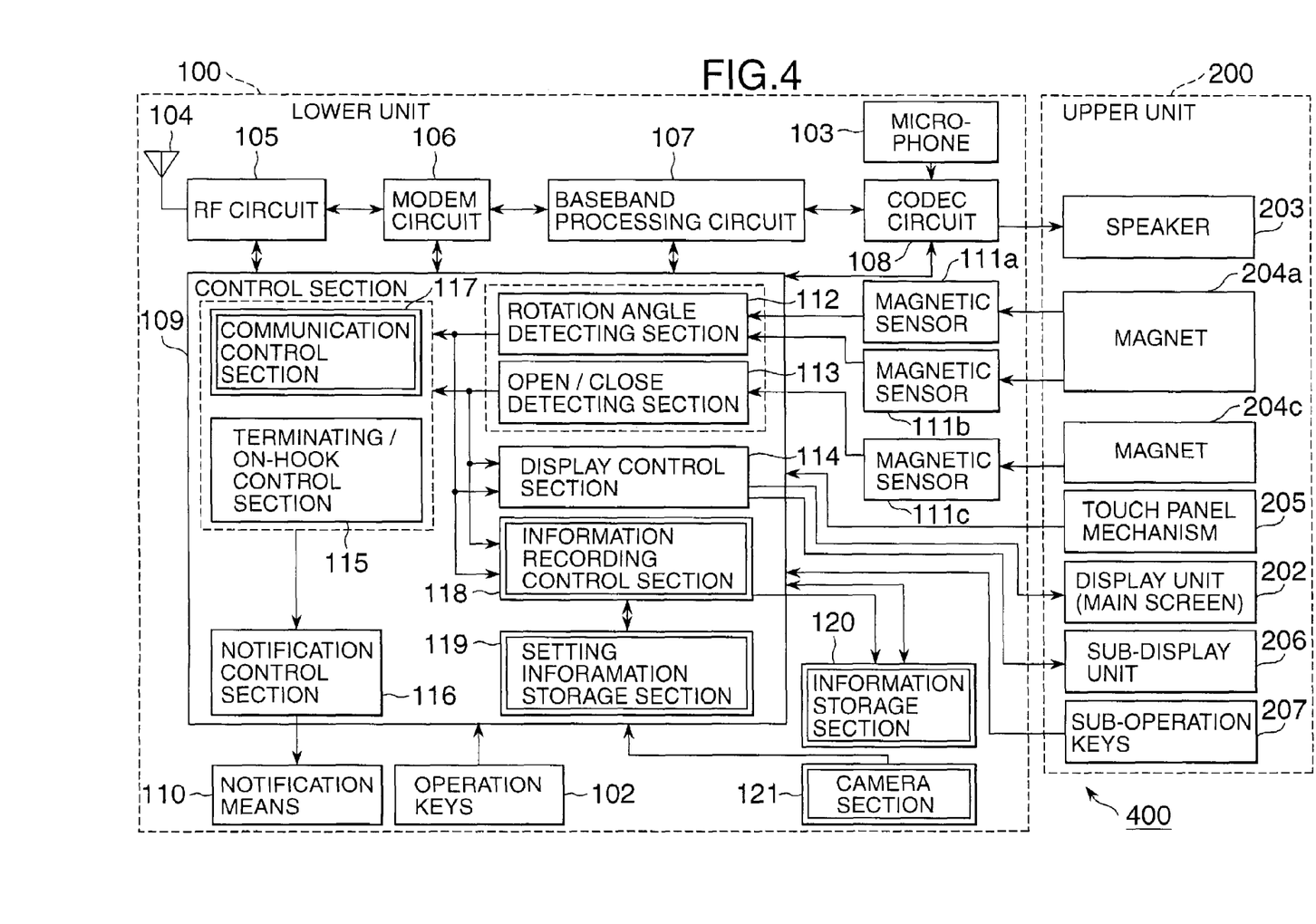
FIG. 4 is a schematic block diagram of an electric circuit section in the embodiment of the present invention.

The outline views of FIGS. 3A to 3C shows the state of the same embodiment in which the upper unit is so unfolded as to become perpendicular to the lower unit, and the display surface is rotated sideways toward the side opposite to the camera section opening portion, thereby taking a different posture. FIG. 4 is a schematic block diagram of an electric circuit section 400 according to this embodiment.

The cellular phone set 500 shown in FIGS. 1A to 1C is mainly comprised of three sections, namely a lower unit 100 having an operating section, an upper unit 200 having a display section, and the biaxial hinge 300 serving as a movable joining member (universal hinge portion) which pivotally/rotatably couples the lower unit 100 and upper unit 200.

The lower unit 100 and upper unit 200 have flat, elliptic shapes having predetermined thicknesses and almost the same size. The lower unit 100 and upper unit 200 are mechanically coupled to each other via the biaxial hinge 300. The upper unit 200 is designed to freely rotate/pivot about the biaxial hinge with respect to the lower unit 100. In addition, the lower unit 100 and upper unit 200 are electrically connected to each other by a proper connection means via the biaxial hinge.

The respective sections enclosed with a dashed line 100 in FIG. 4 are housed or mounted in an outer case 101 of the lower unit 100. An operating section constituted by a plurality of operation keys 102 for the use of the functions of the cellular phone set 500 is disposed on a one surface (operation surface) 101a of the lower unit 100. An opening portion for the microphone 103 is formed in the distal end portion of the same operation surface. A first pivot shaft (horizontal rotating shaft) 301 is pivotally fixed on the operation surface almost vertically at a middle position in the direction of width which is near the proximal end portion of the operation surface and spaced apart from an edge portion of the lower unit by a predetermined distance (almost ½ the thickness of the upper unit), with the distal end portion of the shaft protruding.

The respective portions (to be described later) enclosed with a dashed line 200 in FIG. 4 are housed or mounted in an outer case 201 of the upper unit 200. A display unit 202 having an almost rectangular shape is disposed on one surface (display surface) 201a of the upper unit in portrait orientation. A speaker 203 is disposed on the distal end portion. Note that a compact sub-display unit 206 is disposed on the surface opposite to the display surface 201a.

A second pivot shaft (opening-closing/rotating shaft) 302 is pivotally mounted on the upper unit proximal end portion (coupling side) so as to be located at a substantially middle portion in the direction of thickness of the upper unit. The middle portion of the second pivot shaft 302 is pivotally coupled to the distal end portion of the first pivot shaft 301, and brackets 303 are attached to the distal end portions of the shaft portion extending to two sides. The brackets 303 are firmly fixed to the upper unit 200 from the inside.

As described above, the cellular phone set 500 according to this embodiment is mechanically designed such that the proximal end portions of the upper and lower units 200 and 100 are coupled to each other by the biaxial hinge 300 including two orthogonal pivot shafts which can pivot independently.

The detailed structure of the pivot mechanism formed from the biaxial hinge 300, which is used in this embodiment and a characteristic feature of the present invention, will be further described with reference to FIG. 1C and FIGS. 2A to 2D. This biaxial hinge 300 is comprised of the first metal pivot shaft (to be also referred to as the horizontal rotating shaft hereinafter) 301 pivotally fixed to a metal base plate 304 housed in the lower unit 100 and fixed thereto from the inside, with the distal end portion of the shaft vertically protruding from the operation surface of the lower unit, and the second metal pivot shaft (to be also referred to as the opening-closing/rotating shaft hereinafter) 302 which extends through the distal end portion of the horizontal rotating shaft 301 at a right angle with respect to the horizontal rotating shaft 301 and pivotally fixed thereto so as to be horizontal (parallel to the lower unit).

Click plate biasing springs 305 in the form of coils and annular metal click plates 306 are wound, in a loosely fitted state, around the extending shaft portions of the opening-closing/rotating shaft 302 which extend to the two sides. Each of the L-shaped metal brackets 303 is fixed to a corresponding one of the distal end portions of the extending shaft portions at one end 303a. The other end 303b of the bracket 303 is formed into a mount wing portion 303c which is an L-shaped leg portion bent at a right angle and extending horizontally. The distal end portion of the horizontal rotating shaft 301, the opening-closing/rotating shaft 302, the brackets 303, and the like are housed in the upper unit 200, and the brackets 303 are fixed to the upper unit 200 from the inside by using mount holes 303d formed in the mount wing portions 303c.

The horizontal rotating shaft 301 and opening-closing/rotating shaft 302 can independently pivot within limited ranges. In this embodiment, the horizontal pivot range of the horizontal rotating shaft 301 is limited to ±180° and the pivot range of the opening-closing/rotating shaft 302 is limited to 0° to 180° by providing restriction means (stoppers) for the respective rotating shaft mechanisms. Horizontal rotation is restricted by a horizontal rotating shaft restriction means (stopper), whereas opening-closing rotation is restricted by abutting the click mechanism against the outer case.

The horizontal rotating shaft restriction means will be described. The base plate 304 has a substantially rectangular shape. One long side portion 304a of the base plate 304 conforms to the curved shape of the coupling side end portion of the outer case of the lower unit. A long guide hole 304c having a predetermined width and predetermined length is formed in the middle portion of the long side portion at a predetermined distance from the other long side portion 304b of the base plate 304. A middle portion of the long side portion 304b which corresponds to the long guide hole 304c is cut away by a predetermined width. This forms a guide rod 304d having a rectangular cross-section on the long side portion 304b. A horizontal rotation angle restricting stopper piece 307 is fitted on the guide rod 304d so as to be slidable by a predetermined distance. A lock pawl 307a (FIG. 2D) protrudes from the lower middle portion of the horizontal rotation angle restricting stopper piece 307 toward the horizontal rotating shaft 301.

A projection 301a that comes into contact with the lock pawl 307a is formed on the lower end of the horizontal rotating shaft 301 and rotates together with the horizontal rotating shaft 301. When this projection 301a comes into contact with the lock pawl 307a of the horizontal rotation angle restricting stopper piece 307 as the rotating shaft pivots, the horizontal pivot range (rotation angle) of the upper unit is restricted. In this embodiment, in order to restrict the rotation angle to ±180° (the upper unit rotates through 180° clockwise and counterclockwise from the completely folded state), the horizontal rotation angle restricting stopper piece 307 is designed to slide by an amount corresponding to the width of the projection 301a of the horizontal rotating shaft stopper. This prevents the upper unit 200 from rotating beyond the folding position. It is more preferable that a lock mechanism for holding a rotation angle with weak force be provided in accordance with the middle position (rotation angles of +90° and −90°) between the two positions, i.e., the normal voice communication position and the folding position.

The click mechanism will be described next. The click mechanism is a mechanism for generating an attracting torque for the open state and closed state (a torque that attracts the upper unit toward the opening position or closing position when it comes close to the opening position or closing position) and generating a holding torque at the position. The click mechanism in this embodiment is comprised of the click plates 306 having click plate projections 306a, bracket grooves 308, and the click plate biasing springs 305.

The click plate projections 306a protruding toward the bracket side (outside) are formed on the click plates 306. The bracket grooves 308 are formed in the inward surfaces of the brackets 303. The bracket grooves 308 engage with the click plate projections 306a when the brackets 303 are at a predetermined pivot position. The bracket grooves 308 are located at positions (e.g., angles of 160° and 180°) where clicks are produced at the closing and opening positions.

Figure 2A:
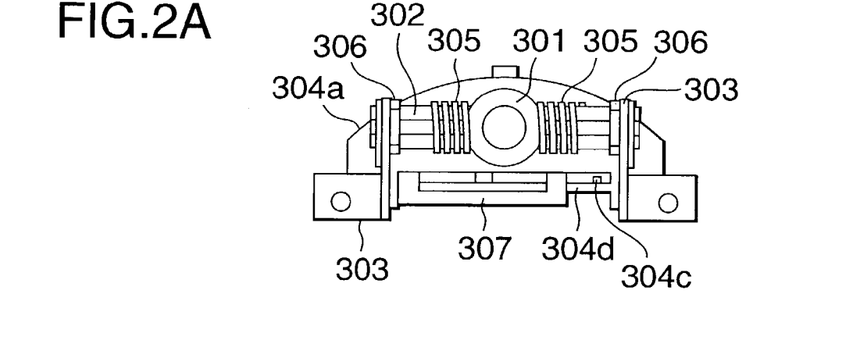
FIG. 2A is a plan view.
Figure 2B:
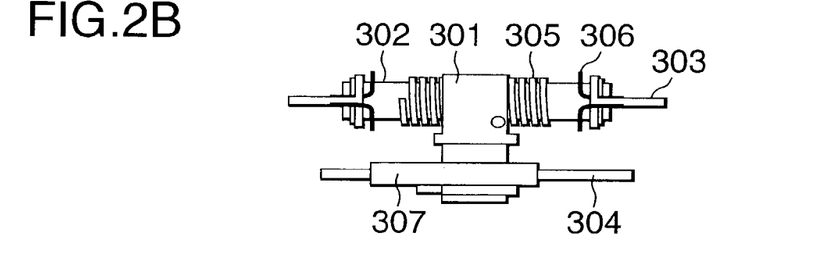
FIG. 2B is a front view.
Figure 2C:
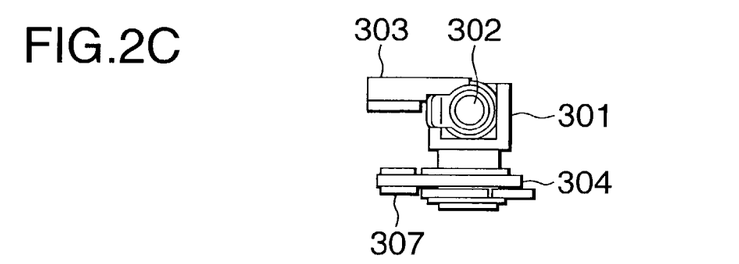
FIG. 2C is a side view.
Figure 2D:
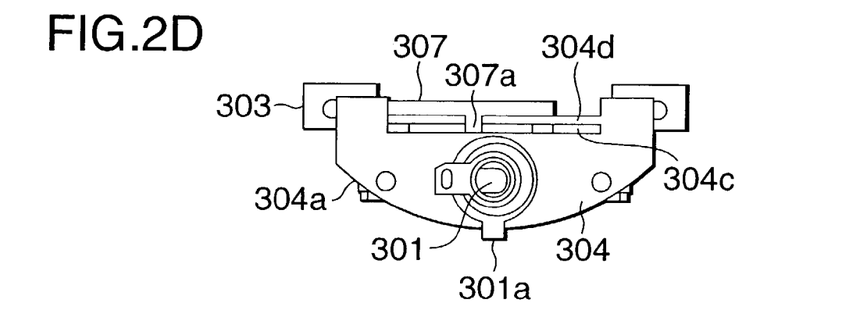
FIG. 2D is a bottom view.

The click plate biasing springs 305 press the click plates 306 against the brackets 303. This biasing force defines a click torque. Referring to FIGS. 2A and 2B, the illustration of the click plate biasing springs 305 is partly omitted, and hence the click plate biasing springs 305 look as if they were separated from the click plates 306. In fact, however, the biasing springs 305 are compressed and mounted between the click plates 306 and horizontal rotating shaft 301 and always bias the click plates 306 outward. A click is produced when the click plate projections 306a fall into the bracket grooves 308 at a predetermined opening/closing position. Note that the frictional force between the click plates 306 and the brackets 303 holds an open/closed state (unfolding angle) with weak force even at positions other than the click producing positions.

The upper and lower units can be electrically connected to each other by a known proper method. For example, the horizontal rotating shaft and opening-closing/rotating shaft may be formed from hollow shafts, and a stranded wire is sequentially passed through the hollow portions, thereby establishing necessary electrical connection between the upper and lower units. Alternatively, film-like FPCs (Flexible Print Circuits) may be wound around the two rotating shafts, and the two end portions of each FPC may be connected to the upper and lower units. In this case, in order to increase the durability of the FPCs, they are preferably wound around the respective rotating shafts by one or more turns.

With the above biaxial hinge, the opening-closing/rotating shaft can pivot with respect to the horizontal rotating shaft. However, an arrangement in which an opening-closing/rotating shaft and a horizontal shaft-like portion are firmly fixed and brackets are pivotally fixed to the two end portions of the horizontal shaft-like portion can be used in the same manner as the above biaxial hinge. This structure allows the upper and lower units 200 and 100 to independently pivot in the horizontal direction and opening/closing direction. Such a biaxial hinge arrangement can be considered to make the shaft-like portion and brackets form an opening-closing/rotating shaft (second pivot shaft). The biaxial hinge according to the present invention therefore includes this arrangement.

The electric circuit and the like in this embodiment will be described next. As shown in the block diagram of FIG. 4, the cellular phone set according to this embodiment includes an antenna 104, an RF circuit 105, a modem circuit 106, a baseband processing circuit 107, a codec circuit 108, the control section 109, the microphone 103, the operation keys 102, a notification means 110, and three magnetic sensors 111a, 111b, and 111c for detecting the position of the upper unit (its posture with respect to the lower unit). The cellular phone set according to this embodiment also includes the camera section 121 for sensing a moving image or still image, the information storage section 120 for recording received information or the information input from the camera section 121, microphone 103, and the like, and the setting information storage section 119 which stores various setting information associated with information recording and information recording cancellation depending on the relative position of the upper and lower units or the like. These functional sections are mounted in the lower unit 100. An opening portion for the camera section 121 is formed in one side surface of the lower unit 100.

The control section 109 includes an upper unit posture detection means (rotation/open-close detecting section) of discriminating the open-close/pivot state of the upper unit, which is constituted by a rotation angle detecting section 112 for discriminating the rotation angle of the upper unit 200 on the basis of an output from each magnetic sensor 111, and an open/close detecting section 113 for discriminating an open/closed state or an upper or lower surface, and a function (communication control section 117) of discriminating a communication state. The control section 109 further includes a display control section 114 for controlling the orientation and the like of display contents in accordance with the display contents and outputs from the rotation angle detecting section 112 and open/close detecting section 113, a terminating/on-hook control section 115 which can perform terminating control operation corresponding to the opening/closing operation and moving operation of the upper unit, and a notification control section 116 which can control incoming call notifying operation corresponding to the opening/closing operation and moving operation of the upper unit. The control section 109 also has a recording section control means (information recording control section 118) for managing the storage capacity and the like of the information storage section 120 described above, and a timepiece function using a timepiece control section (not shown).

The RF circuit 105 includes a reception circuit, transmission circuit, and frequency synthesizer (none of which are shown). The operation keys 102 constituting the operating section include a known transmission key, alphabet/kana/ kanji/numeral conversion keys, a power ON/OFF key, a criss-cross key used for cursor operation, an end key, and the like.

The cellular phone set according to this embodiment further includes the speaker 203, a magnet 204a located in correspondence with the magnetic sensors 111a and 111b, a magnet 204c located in correspondence with the magnetic sensor 111c, the display unit (liquid crystal display: LCD) 202 serving as a main screen, a touch panel mechanism 205 incorporated in the surface of the display unit 202, the sub-display unit 206, and sub-operation keys 207. These functional sections are mounted in the upper unit 200. Note that the speaker 203 serves both as a telephone receiver and the notification means 110. The above respective sections constituting the electric circuit section are known, and hence a detailed description of the arrangement, function, and the like thereof will be omitted in this specification.

Characteristic operation of this embodiment will be described next with reference to the accompanying drawings. In the cellular phone set 500 according to this embodiment having the two units coupled to each other via the biaxial hinge 300 described above, the upper unit 200 can open/close (can pivot about the second pivot shaft 302) with respect to the lower unit 100 and also can pivot about the first pivot shaft 301 with respect to the lower unit 100. Therefore, pivoting of the upper unit 200 in the direction of the upper/lower surfaces is limited to a direction perpendicular to the second pivot shaft 302. However, the upper unit 200 can pivot about the first pivot shaft position and move to an arbitrary position on one surface side of the lower unit 100. In addition, the upper unit 200 can be turned upside down and located at the same position. That is, the lower unit 100 and upper unit 200 can take various relative postures as needed, and the relative posture can be held at a predetermined lock position by the horizontal rotating shaft restriction means and click mechanism. The relative posture at each lock position can be detected by the upper unit posture detection means constituted by the magnetic sensors 111 described above, the magnets 204 that work in cooperation with the magnetic sensors 111, and the rotation angle detecting section 112 and open/close detecting section 113 which process outputs from the magnetic sensors 111.

Figure 5A:
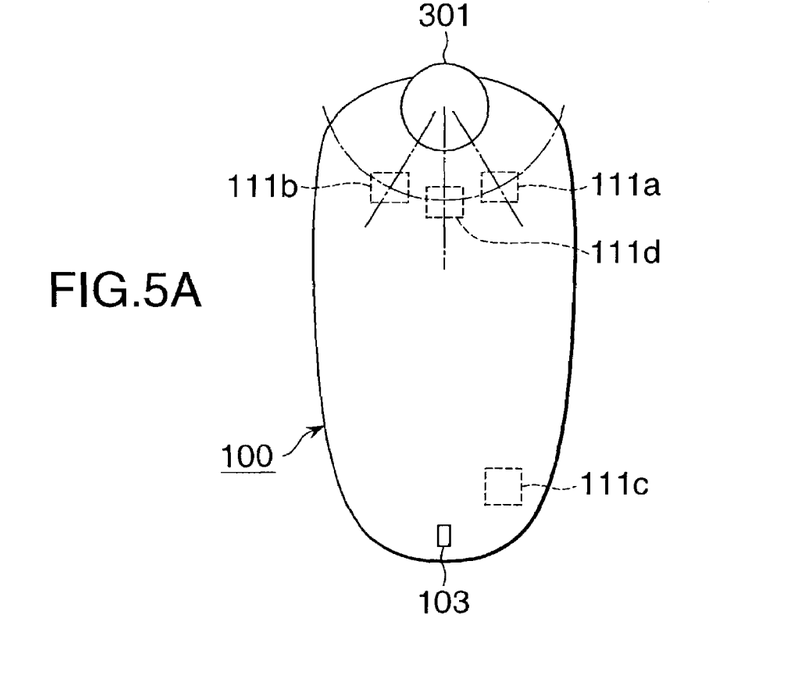
FIGS. 5A and 5B are schematic views for explaining the arrangement of magnetic sensors and magnets according to the embodiment of the present invention.
Figure 5B:
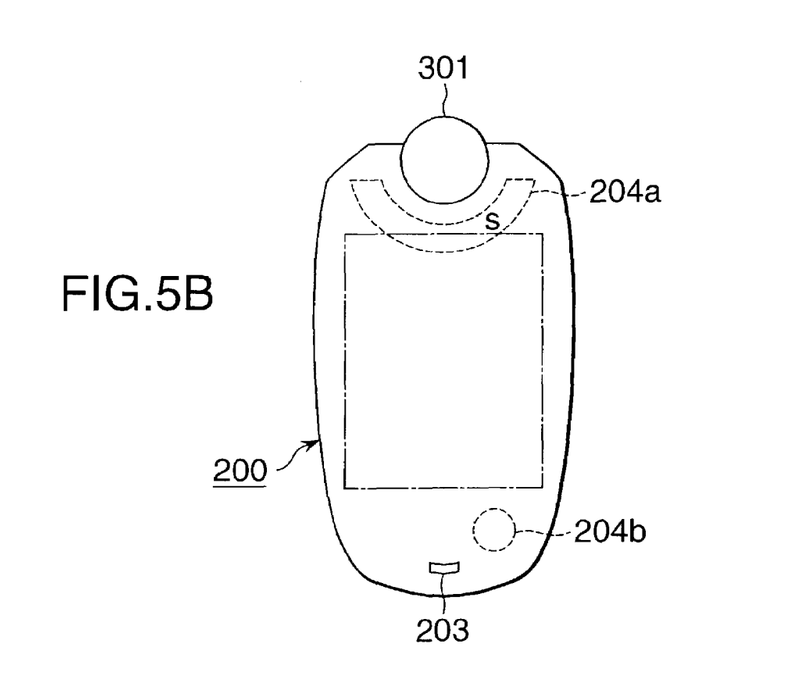

The mount positions of the magnetic sensors 111 and magnets 204 for detecting the relative posture of the lower unit 100 and upper unit 200 in this embodiment will be described in detail below. FIGS. 5A and 5B are schematic views for explaining the arrangement of the magnetic sensors and magnets in this embodiment. As shown in FIG. 5A, the four Hall elements (magnetic sensors) 111 are arranged in the lower unit 100 with their sensitive sides facing the operation surface. The two Hall elements 111a and 111b are arranged on an arc centered on the horizontal rotating shaft 301 and having a predetermined radius, a lower half arc in FIG. 5A, so as to be located on radial lines each forming an angle of 45° with the major axis of the lower unit (the center opening angle: 90°). The third Hall element 111d is placed at the intersection of the major axis of the lower unit and the arc centered on the horizontal rotating shaft 301 and having the predetermined radius. The fourth Hall element 111c is placed on one side of the distal end portion of the lower unit. Each Hall element can also detect the direction of the magnetic field produced by a corresponding one of the magnets.

As shown in FIG. 5B, a semi-annular magnet 204a magnetized in the direction of thickness is mounted in the upper unit 200 along the arc centered on the first pivot shaft 301 on the lower side in FIG. 5B. The magnet 204c is mounted on the distal end portion of the upper unit in correspondence with the Hall element 111c. Note that the semi-annular magnet need not always be used, and separate magnets may be arranged at positions corresponding to the Hall elements 111a and 111b, respectively.

Figure 6A:
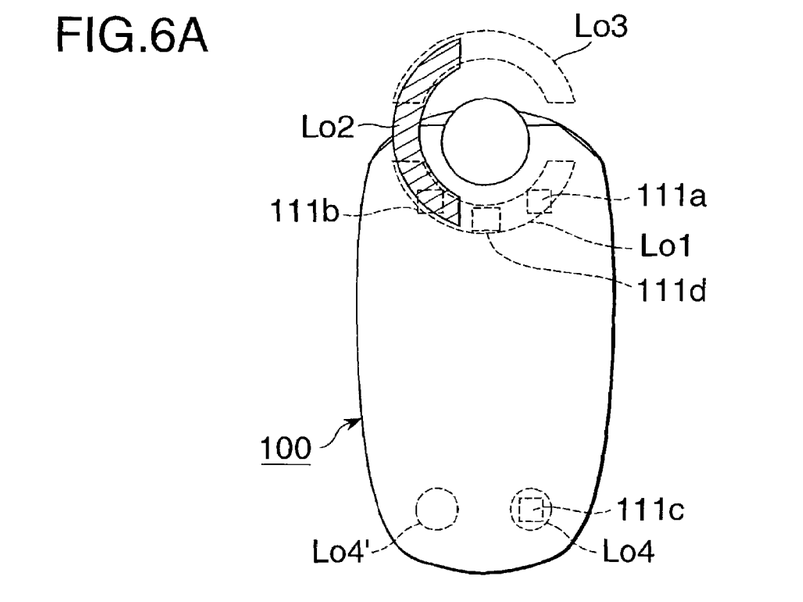
FIGS. 6A and 6B are views showing the positions of the magnets with respect to the Hall elements in the lower unit in correspondence with the main pivot positions of the upper unit with respect to the lower unit in the embodiment of the present invention.
Figure 6B:
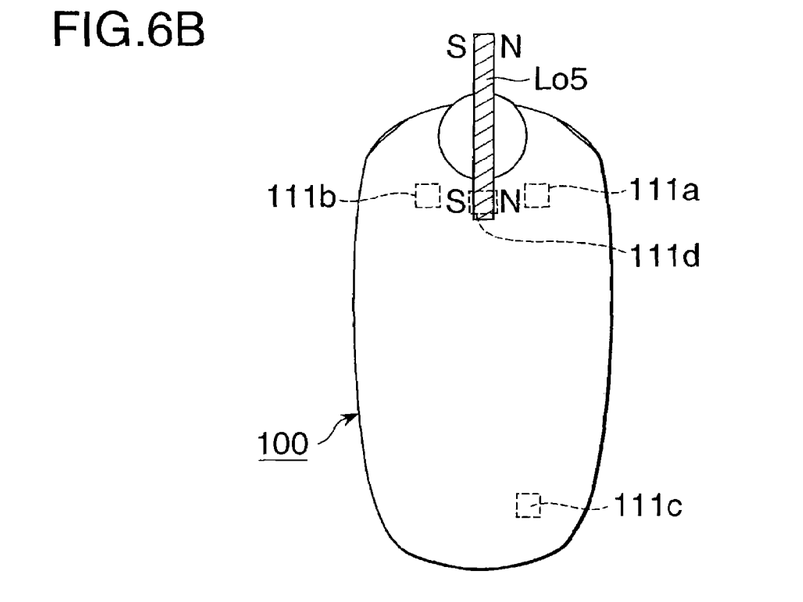

FIGS. 6A and 6B are views for explaining the positions of the magnets corresponding to the Hall elements of the lower unit 100 at the respective main pivot positions of the upper unit with respect to the lower unit. FIG. 6A shows a case wherein the upper and lower units are parallel to each other. Referring to FIG. 6A, reference symbols Lo1 and Lo4 denote the positions of the magnets 204a and a magnet 204b when the two units are folded with the display surface facing outside. At this time, since outputs can be obtained from all the Hall elements 111a, 111b, and 111c, the current state (posture) of the upper unit can be discriminated from outputs from the rotation angle detecting section 112 and open/close detecting section 113 described above.

Reference symbol Lo2 denotes the position of the magnet 204a when the upper unit pivots through 90° clockwise in FIG. 6A. In this case, since an output is obtained from only the Hall element 111b, the state (posture) of the upper unit can be discriminated. Reference symbol Lo3 denotes the position of the magnet 204a when the upper unit further pivots through 90° clockwise (normal voice communication posture) in FIG. 5A. In this case, since no output is obtained from any Hall elements, the state (posture) of the upper unit can be discriminated.

When the two units are folded with the display surface facing inside, the magnet 204a is also located at the position Lo1 (the direction of the magnetic field is opposite to that in the case shown in FIGS. 6A and 6B). In this case, however, since the magnet 204c is located at a position Lo4' and does not coincide with the Hall element 111c, the folded state of the units with the display surface facing inside can be discriminated.

FIG. 6B shows a case wherein the upper unit is in an upright posture in which the upper unit is almost perpendicular to the lower unit, and the direction of width of the upper unit is parallel to the major axis of the lower unit. Assume that the display surface side of the upper unit faces the camera opening portion. In this case, when the two units are folded with the display surface facing outside, the magnet 204a is located at a position Lo5. Note that the magnet 204b (not shown) is located at the longest distance from the lower unit. In the state shown in FIG. 6B, since an output is obtained from only the Hall element 111d, the current state (posture) of the upper unit, including whether the display surface faces outside or inside, can be discriminated, from outputs from the rotation angle detecting section 112 and open/close detecting section 113. In addition, when the display surface side of the upper unit faces a side opposite to the camera opening portion, the state (posture) of the upper unit can be discriminated from the output obtained from only the Hall element 111d.

As described above, in this embodiment, the lower and upper units can take various relative positions (relative postures) as needed. At each of the lock positions in the horizontal pivot direction indicated by the outline views of FIGS. 1A and 1B, FIGS. 3A to 3C, and FIGS. 7A to 7D, in particular, in a posture in which the upper unit is unfolded perpendicularly with respect to the lower unit (this posture will be referred to as an upright posture hereinafter), the relative posture of the units can be held. The postures of the units can be separately detected (discriminated) by the upper unit posture detection means constituted by the magnetic sensors 111 described above, the magnets 204 that work in cooperation with the magnets, and the like.

Figure 7A:
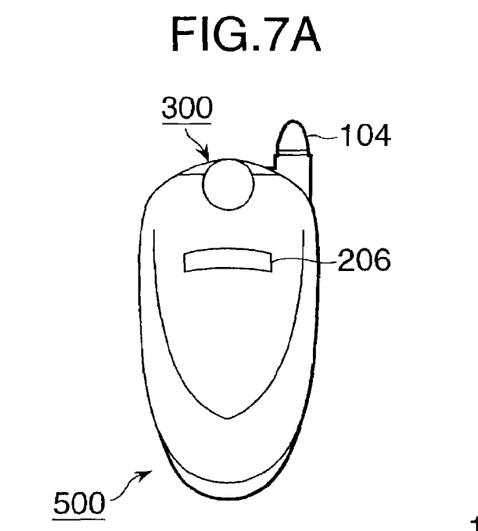
FIGS. 7A to 7D are outline views for explaining the main lock positions (relative postures) of the lower and upper units in the embodiment of the present invention.

FIG. 7A is an outline view showing a state wherein the embodiment is folded in a direction in which the display surface of the upper unit faces the lower unit. This state is the same as the state wherein a conventional cellular phone set is folded. In this state, the overall cellular phone set is compact and easy to carry. In addition, the display surface is protected by not being exposed to the outside. Note that information in a minimum range is displayed on the sub-display unit 206.

Figure 7B:
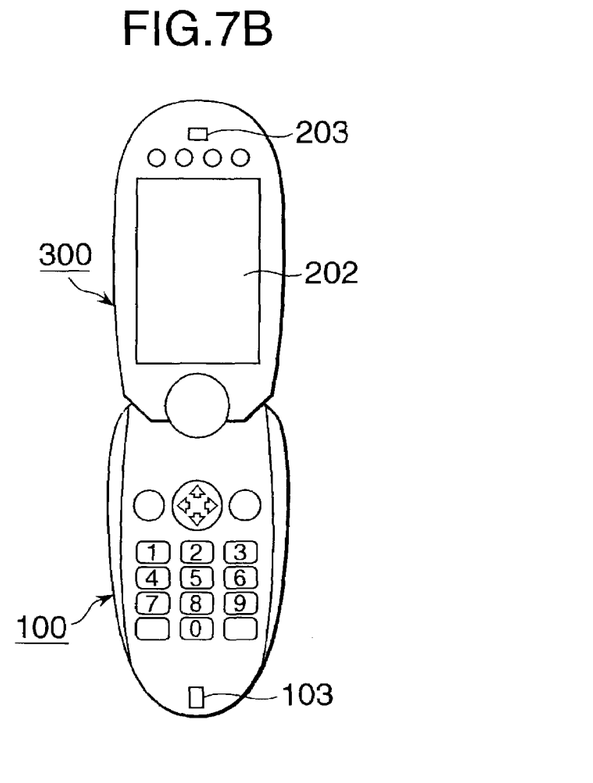

FIG. 7B is an outline view showing a state (normal voice communication position) wherein the upper unit 200 in the state shown in FIG. 7A is pulled upward and unfolded. In this state, the user can check displayed information, perform various operations, and make voice communication.

Figure 7C:
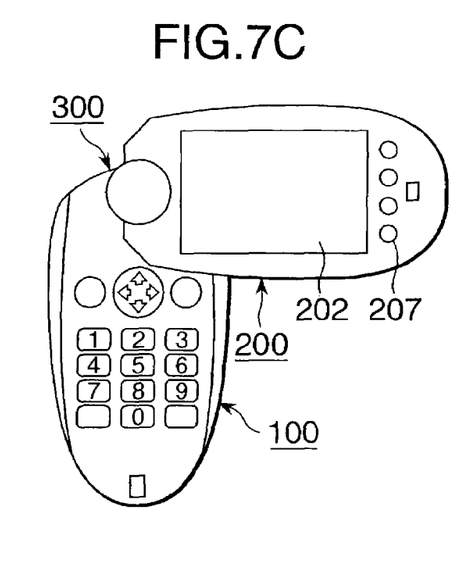
Figure 7D:
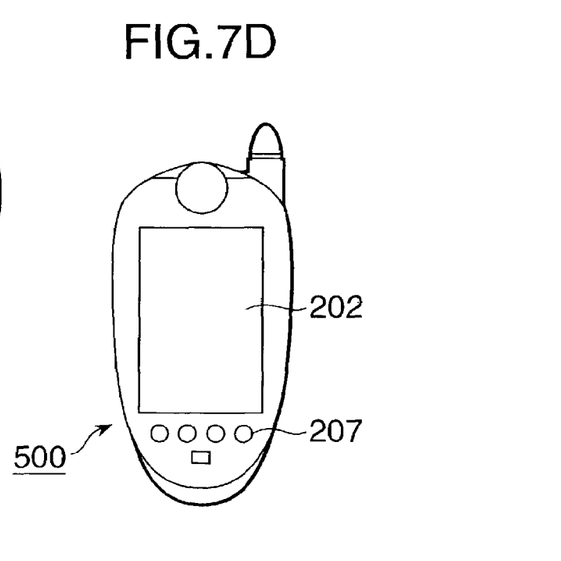

FIG. 7C is an outline view showing a state wherein the upper unit 200 in, for example, the state shown in FIG. 7B is pivoted through about 90° along a plane parallel to the operation surface 101a of the lower unit 100. At this time, the display section is set in landscape orientation. Note that when the upper unit in the folded state shown in FIG. 7D is slid and pivoted counterclockwise, the cellular phone set is also set in the state shown in FIG. 7C.

When the upper and lower units are in the positional relationship shown in FIG. 7C, the upper unit posture detection means described above detects this positional relationship, and the display control section 114 converts the display contents to be displayed on the display unit 202 in accordance with the upward/downward direction of the operation surface 101a and displays the contents in landscape orientation (with the left and right sides of the display contents coinciding with the long side direction of the display unit). At this time, with regard to information with directivity in terms of processing corresponding to operation, e.g., a direction key (cursor key), of information associated with the operating section or second operating section, the corresponding processing contents are matched with the display direction.

In the state shown in FIG. 7C, the display surface in landscape orientation allows the user to easily check a large volume of character information and makes a landscape image more eye friendly. In this manner, the cellular phone set according to this embodiment allows the user to perform proper operation as needed, e.g., seeing information upon setting the display section in landscape orientation in an open state.

Although not shown, in contrast to the above description, the upper unit 200 in the normal voice communication position (standard unfolded state) shown in FIG. 7B can be pivoted through about 90° counterclockwise in the direction of the display surface. In this case as well, the upper unit 200 and lower unit 100 become almost perpendicular to each other in substantially the same plane, and the display unit is set in landscape orientation with respect to the upward/downward direction of the operation surface.

In this case as well, the upper unit posture detection means detects that the upper and lower units are in such a positional relationship. In accordance with this detection, the display control section 114 converts the display contents to be displayed on the display unit 202 in accordance with the upward/downward direction of the operation surface (making the left and right sides of the display contents coincide with the long side direction of the display unit; the direction of the display contents becomes relatively opposite to that in the state shown in FIG. 7C) and displays the contents in landscape orientation.

In this embodiment, the units can be closed in a state opposite to the standard state, i.e., can be closed while the display section that normally faces inside is made to face outside. FIG. 7D is an outline view showing a state wherein the upper unit 200 is folded with respect to the lower unit 100 with the display surface of the upper unit facing outside.

When, for example, the upper unit 200 is rotated a half turn from the state wherein the cellular phone set is open (FIG. 7B), the upper unit can be closed in the opposite direction with its display surface facing outside, as shown in FIG. 7D. In this state, the cellular phone set becomes compact and easy to carry, and the user can check display contents while the cellular phone set is folded. In addition, since the second operating section 207 is exposed to the outside, the user can perform predetermined operation in accordance with the display contents by using the second operating section 207.

Note that the upper unit posture detection means may detect the folded state shown in FIG. 7D, and the display contents may be displayed upside down on the display unit. At this time, with regard to information with directivity in terms of processing corresponding to operation, e.g., a direction key (cursor key), of information associated with the second operating section, the corresponding processing contents are matched with the display direction. With this operation, the user can read displayed information and perform necessary operation while holding the cellular phone set in his/her hand in the same manner as in the standard folded state without changing the orientation of the cellular phone set from the normal orientation.

Assume that the embodiment is in the state (upright posture) shown in FIGS. 1A and 1B. In this case, when the user holds the cellular phone set while facing the display unit 202, the opening portion for the camera section 121 also faces the user. The user can check his/her face sensed by the camera section 121 on the display unit 202. This allows the user to use the cellular phone set as a videophone set while transmitting an image of the user himself/herself. This state is also suitable when the user records his/her image.

Assume that the embodiment is in the state (upright posture) shown in FIGS. 3A and 3C. In this case, when the user holds the cellular phone set while facing the display unit 202, the opening portion for the camera section 121 is located on the side opposite to the display unit 202. This state is therefore suitable when the user uses the camera section 121 to sense and record outer scenery, others, and the like while checking them on the display unit 202. Note that recording of an image and the like can be controlled in association with upright posture detecting operation, as will be described later.

The voice communication function, the data transmission/reception function and the like, the display function and the like corresponding to each posture, and the communication control function in the embodiment described above are the same as those of the cellular phone set disclosed in Japanese Patent Application No. 2001-303959. Characteristic operation of the present invention will be further described below.

According to the cellular phone set of this embodiment, the recording section is set in the information recording mode when a predetermined relative posture, of the relative postures (relative positions) of the lower and upper units, is detected by the sensors 111 and the magnets 204 which work in cooperation therewith during voice communication or a standby period.

The user can therefore make a setting in advance to enable the information recording mode when the relative position (relative posture) of the lower and upper units shifts to a predetermined posture during voice communication or a standby period. For example, the user performs setting operation for input setting to enable the voice information recording mode when, for example, the relative position of the lower and upper units changes in such a manner that the upper unit in the position (posture) shown in FIG. 7B is slightly pivoted about the second pivot shaft 302 (opening/closing operation) so as to shift the current mode to the information recording mode. The corresponding information is then stored in the setting information storage section 119. It is preferable that a click mechanism is also provided at a pivot position where the information recording mode is started.

Assume that the above operation setting is made. In this case, when the user slightly pivots the upper unit about the second pivot shaft 302 (opening/closing operation) in the cellular phone set whose two units are in the positional relationship shown in FIG. 7B, the current mode shifts to the information recording mode to store the voice information input from the microphone 103 in the information storage section 120 for a predetermined period of time or store information corresponding to a predetermined storage capacity therein, if the cellular phone set is in a standby period. If the user is performing voice communication, recording of received information (voice) is started in response to the same operation (relative position shift), and information is recorded on the information storage section 120 for a predetermined period of time or information corresponding to a predetermined storage capacity is recorded thereon.

In this embodiment, a control procedure for enabling the information recording mode when the relative position of the lower and upper units shifts to the above position is set and stored in the setting information storage section 119 in advance. In addition, a control procedure for canceling the information recording mode when the upper unit of the cellular phone set at a position at which the information recording mode is enabled is pivoted to be shifted again to the position shown in FIG. 7B can be set. When such settings are made, if the user returns the upper unit to the state shown in FIG. 7B, recording is immediately stopped.

In this embodiment, in addition to the above settings, the following setting can be selectively made. The user can make input setting to enable the voice information recording mode when the relative position of the lower and upper units changes such that the upper unit at the position (posture) shown in FIG. 7B is pivoted to the position (posture) shown in FIG. 7C or the like. The corresponding information is then stored in the setting information storage section 119.

In addition, the user can make input setting for a control procedure for canceling the information recording mode when the upper unit at the position shown in FIG. 7C is further pivoted to the position shown in FIG. 7B, and stores the setting in the setting information storage section 119, and can also set a control procedure for canceling the information recording mode when the upper unit of the cellular phone set at the position shown in FIG. 7C at which the information recording mode is enabled is pivoted to be shifted to the position shown in FIG. 7B.

If the above operation setting is made, when the user changes the position of the upper unit of the cellular phone set whose two units are in the positional relationship shown in FIG. 7B to the position shown in FIG. 7C (horizontal pivoting operation), the current mode shifts to the information recording mode. If the cellular phone set is in a standby state, the voice information input from the microphone 103 is recorded on the information storage section 120. If the user is performing voice communication, recording of received information (voice) is started in response to the same operation (relative position shift) to record information on the information storage section 120 for a predetermined period of time or record information corresponding to a predetermined storage capacity thereon. When the user performs returning operation, the recording operation is immediately stopped.

In addition, the cellular phone set may be designed such that when the user slightly pivots the upper unit of the cellular phone set in the state shown in FIG. 7B about the first pivot shaft 301 (horizontal pivoting), the current mode shifts to the voice information recording mode during a standby period or voice communication.

Furthermore, in this embodiment, not only voice information but also image information can be recorded. With predetermined setting operation, when image information is received during voice communication, the cellular phone set is controlled in accordance with the same operation as described above to record the received image information on the information storage section 120.

As described above, the embodiment of the present invention has the camera section 121. The operation state of the camera section 121 and recording of image output (output information) therefrom can also be controlled on the basis of the relative position of the lower and upper units or its change.

The outline views of FIGS. 1A and 1B and FIGS. 3A to 3C show examples of the relative position of the lower and upper units at which the camera section 121 which senses a moving image or still image is activated. Referring to FIGS. 1A and 1B, the display unit 202 on the display surface 201*a* of the upper unit is located at a position to face the operator, and the camera section 121 (opening portion) on one side surface of the lower unit is located at a position to face an object to be sensed. Referring to FIGS. 3A to 3C, the display unit 202 on the display surface 201*a* of the upper unit is located at a position to face the operator, and the camera section 121 on one side surface of the lower unit is located at a position to face the object.

This embodiment is configured such that when the relative position (relative posture) of the lower and upper units of the cellular phone set in a standby state is changed (operated) to the state shown in FIGS. 1A and 1B, the mode of recording information from the camera section 121 and microphone 103 is enabled. If predetermined setting operation is done in advance, therefore, when the user moves the upper unit to change the positional relationship between the two units to the state shown in FIGS. 1A and 1B during a standby period, the current mode shifts to the information recording mode. As a consequence, image information (user's portrait in the normal use state) is recorded on the information storage section 120 for a predetermined period of time or information corresponding to a predetermined storage capacity is recorded thereon.

This embodiment is also configured to allow the following setting. When the user slightly changes the posture of the upper unit from the posture shown in FIGS. 1A and 1B during voice communication using the cellular phone set as a videophone set, recording of received information (image information and/or voice information) is started, and information is recorded on the information storage section 120 for a predetermined period of time or information corresponding to a predetermined storage capacity is recorded thereon.

In addition, this embodiment is configured to enable the mode of recording information from the camera section 121 and microphone 103 when the user changes (operates) the relative position (relative posture) of the lower and upper units of the cellular phone set in a standby state to the state shown in FIGS. 3A to 3C. If, therefore, predetermined setting operation is done in advance and the corresponding information is stored in the setting information storage section 119, when the user moves the upper unit to change the positional relationship between the two units to the state shown in FIGS. 3A to 3C during a standby period, the current mode shifts to the information recording mode to store image information (outer scenery or the like in the normal use state) from the camera section 121 in the information storage section 120 for a predetermined period of time or store information corresponding to a predetermined storage capacity therein.

An example of control associated with the embodiment of the present invention will be described below. First of all, the user makes desired settings concerning information recording during a standby period. The setting contents are stored in the setting information storage section 119. The user selects the type of information which he/she wants to store as a setting item. In a standby mode, voice information from the microphone and image information from the camera section can be separately or simultaneously selected. A proper upper unit posture (position) is associated as an initial setting with the selected information. A recording start posture can be input/designated and associated with each information, as needed. In addition, a proper recording time (recording capacity) is associated as an initial setting with the selected information. A recording time can be input/designated and associated with each information, as needed. Manual operation corresponding to a change in unit position for the cancellation of the recording mode can be arbitrarily and additionally set.

In addition, the user can separately or simultaneously select reception contents (voice information and image information) in a voice communication mode. As in the standby mode, a proper upper unit posture (position) is associated as an initial setting with the selected information. A recording start posture can be input/designated and associated with each information, as needed. A proper recording time (recording capacity) is associated as an initial setting with the selected information. A recording time can be input/designated and associated with each information, as needed. Manual operation corresponding to a change in unit position for the cancellation of the recording mode can be arbitrarily and additionally set.

After the setting operation, if the cellular phone set is in an active state, information is recorded for a predetermined period of time in accordance with the setting information stored in the setting information storage section 119 when the user places the upper unit at a predetermined position during a standby period. If, for example, the user sets the upper unit in the unit posture shown in FIGS. 3A to 3C, the unit posture detection means detects this, and the information recording control section 118 operates. As a consequence, the image information sensed by the camera section 121 (input voice from the microphone 103 as well depending on the settings) is recorded on the information storage section 120 for a predetermined period of time. Depending on setting, the recording mode is canceled (recording is stopped) even in the process of recording when the user moves the upper unit from the unit posture shown in FIGS. 3A to 3C. When the user moves the upper unit to the predetermined position set during a standby period, the unit posture detection means detects this, and the information recording control section 118 operates to record input voice from the microphone 103 as a memo on the information storage section 120 for a predetermined period of time.

In addition, when the user places the upper unit at a predetermined position during voice communication, information is recorded for a predetermined period of time in accordance with the setting information stored in the setting information storage section 119. When, for example, the user slightly moves the upper unit from the unit posture shown in FIG. 7B in the closing direction, the unit posture detection means detects this, and the information recording control section 118 operates to record voice information on the information storage section 120 for a predetermined period of time during voice communication. Depending on setting, the recording mode is canceled (recording is stopped) even in the process of recording when the user returns the upper unit to the unit posture shown in FIG. 7B.

According to this embodiment described above, opening-closing/pivoting operation of the upper and lower units which are openably and pivotally coupled to each other is detected during voice communication or a standby period, and information such as voice information and image information is recorded. Therefore, information such as received information, image information from the camera section, and voice information can be easily and simply recorded, thus greatly improving the operability.

In addition, like the cellular phone set disclosed in Japanese Patent Application No. 2001-303959, the cellular phone set according to this embodiment can be folded with the display section facing outside, and hence the user can read mail, see a map or other images, and check a communicating partner upon call termination on the display while the cellular phone set is closed. This allows the user to perform operation, e.g., receiving a telephone call upon determining display contents, while the cellular phone set is closed. When the cellular phone set is folded with the display section facing outside, the user can carry it compactly while seeing the display screen on which a map or the like is displayed. The user can also carry the cellular phone set while the cellular phone set is folded with the display section facing inside to protect it as in the conventional manner. In addition, by pivoting the display section vertically and horizontally, one cellular phone set having the same size as that of the conventional cellular phone set can cope with contents display in both portrait orientation and landscape orientation.

As practical control operations associated with the positions of the two units according to the present invention, the following can be conceived in addition to the above control operations. Movement from a specific position, movement from a specific position for a predetermined short period of time, a return to the specific position, a shift from a specific position to another specific position, and the like are associated with information recording control or other function control operations.

Various control operations can be conceived as follows. For example, when the user moves the cellular phone set during a standby period which is set in the state shown in FIGS. 3A to 3C and returns it to the state shown in FIGS. 3A to 3C within a predetermined short period of time, the outer scenery (image information) monitored by the display unit is recorded for a predetermined period of time. Alternatively, for example, movement of the cellular phone set in the standby state shown in FIGS. 3A to 3C to a lock position which slightly differs from the position in FIGS. 3A to 3C is associated with the start of recording of image information, and a return to the state shown in FIGS. 3A to 3C in the recording mode is associated with the interruption of recording.

With regard to the type of information to be recorded, the cellular phone set may be designed to allow the user to make settings to arbitrarily select and record voice information, moving image information, still image information, and the like. In addition, the recordable capacity of the information storage section may be monitored, and for example, moving image information and voice information, still image information and voice information, only voice information, or only still image information may be selected to be recorded for a predetermined period of time in accordance with the recordable capacity.

In this embodiment, many types of information can be recorded. Obviously, however, the present invention can be configured to record only necessary type of information. For example, the present invention can be applied to recording of voice information in a folding cellular phone set having no camera section. Other portions and association of the positions of the two units with information recording control operations can be variously modified within the technical range of the present invention.

The structure according to this embodiment uses the hinge portion (movable joining member). However, the present invention can be applied to, for example, a folding cellular phone set using one rotating shaft in which voice is handled as information to be stored. In brief, the present invention can be applied to any cellular phone set which has upper and lower units coupled to be relatively movable and allows the detection of the relative posture of the units The cellular phone set has been exemplified as an embodiment of the present invention. However, the present invention is not limited to this and can be applied to a portable information terminal apparatus such as a PDA. In this case as well, the same effects as those described in the embodiment can be obtained.

What is claimed is:

1. A folding portable information terminal including an upper unit having a display section on one surface, a lower unit having an operating section on one surface, and a movable joining member which openably and pivotally couples the upper and lower units to each other, the terminal comprising:

upper unit posture detection means for detecting a pivoting movement of the upper unit;

an information recording section that records voice information;

information recording control means for setting said information recording section in a voice recording mode during voice communication by the terminal when said upper unit posture detection means detects a pivoting movement of the upper unit to a first pivot position, and for setting said information recording section in the voice recording mode during a terminal standby condition when said upper unit posture detection means detects a pivoting movement of the upper unit to the first pivot position, and for inputting a recording time associated with a respective recording in the voice recording mode, and for cancelling the voice recording mode when said upper unit posture detection means detects a counter pivoting movement from the first pivot position; and a click mechanism that indicates the first pivot position.

2. The terminal according to claim 1, wherein, during voice communication by the terminal, said information recording section records voice information received through a communication line in the terminal.

3. The terminal according to claim 1, wherein, during the terminal standby condition, said information recording section records voice information received through a microphone in the terminal.

4. The terminal according to claim 1, wherein said information recording section records at least one of still and moving images, and said information recording control means sets said information recording section in a mode of recording the at least one of still and moving images in response to a predetermined movement of the upper unit detected by said upper unit posture detection means.

5. The terminal according to claim 1, wherein said information recording control means causes said information recording section to record information corresponding to a predetermined storage capacity when said upper unit posture detection means detects a movement of the upper unit to or from a predetermined position.

6. The terminal according to claim 1, wherein said upper unit posture detection means comprises a plurality of magnets (or magnetic field detectors) arranged in predetermined positions inside the upper unit or the lower unit, a magnetic field detector (or a magnet) placed in a predetermined position inside the other unit in correspondence with the plurality of magnets (or magnetic field detectors), and a position determining circuit which determines a position of the upper unit on the basis of an output from the magnetic field detector which corresponds to distances to the magnets and is obtained in accordance with an open/closed state and pivot position of the upper unit with respect to the lower unit.

* * * * *